United States Patent [19]

Lee et al.

[11] Patent Number: 5,060,067

[45] Date of Patent: Oct. 22, 1991

[54] SYSTEM FOR NEGATING THE EFFECTS OF DC OFFSETS IN AN ADAPTIVE EQUALIZER

[75] Inventors: Ronald B. Lee; Larry E. Nielsen, both of Chicago, Ill.

[73] Assignee: Zenith Electronics Corporation, Glenview, Ill.

[21] Appl. No.: 618,188

[22] Filed: Nov. 26, 1990

[51] Int. Cl.$^5$ .............................................. H04N 5/21
[52] U.S. Cl. .................................. 358/167; 358/905
[58] Field of Search .............. 358/171, 34, 21 V, 187, 358/905, 167, 36, 166, 37

[56] References Cited

U.S. PATENT DOCUMENTS

| 4,364,093 | 12/1982 | Holmes | 358/905 |
| 4,495,523 | 1/1985 | Ozawa | 358/167 |
| 4,821,087 | 4/1989 | Honjo | 358/34 |

FOREIGN PATENT DOCUMENTS

| 0102668 | 5/1987 | Japan . |
| 0099378 | 4/1989 | Japan . |
| 0190082 | 7/1990 | Japan . |

*Primary Examiner*—James J. Groody
*Assistant Examiner*—Jeffrey S. Murrell

[57] ABSTRACT

An adaptive filter for equalizing a received information signal is controlled by an error signal generated in response to a reference signal alternately transmitted in inverted and non-inverted form. The received reference signal transmitted in inverted form is reinverted prior to generating the error signal for negating the effects of DC offsets acquired by the reference signal during transmission and reception.

10 Claims, 2 Drawing Sheets

SYSTEM FOR NEGATING THE EFFECTS OF DC OFFSETS IN AN ADAPTIVE EQUALIZER

BACKGROUND OF THE INVENTION

The present invention relates generally to adaptive equalizers and particularly concerns a technique for negating the effects of DC offsets in the operation of such equalizers.

It is known to incorporate reference signals in a television broadcast for various purposes including, for example, synchronizing the reproduction of the displayed image and operating an adaptive transversal filter for canceling ghost signals. To provide improved noise immunity, the reference signal may, for example, comprise a pseudo noise (PN) sequence. In the ghost canceling application, ghost signals introduced into the broadcast are canceled by using the received reference signal to identify the presence of ghost signals which are then replicated by a transversal filter and subtracted from the received broadcast. More particularly, an error signal is developed in the receiver by subtracting a stored replica of the reference signal from the received reference signal, which may be accompanied by one or more ghost components. The error signal, which therefore represents the existence of ghost components, is then used in a feedback loop to control a adaptive transversal filter for generating replica ghost signals which are subtracted from the received signal to cancel the ghost signals.

Quite often, during either or both the transmission or demodulation process, the received reference signal can acquire a DC offset which appears as a relatively constant component in the error signal fed back to the transversal filter. This constant component of the error signal prevents proper operation of the transversal filter which therefore can no longer generate correct ghost replica signals. The susceptibility of the reference signal to DC offsets thus severely limits its usefulness in controlling the transversal filter for generating ghost replicas.

It is therefore a basic object of the present invention to provide a transmission system in which a reference signal is used for facilitating the accurate generation of replica ghost signals in an adaptive transversal filter.

It is a more specific object of the invention to provide a system for negating the effects of DC offsets acquired by a reference signal during transmission and/or reception to facilitate the use thereof for controlling the generation of replica ghost signals in an adaptive transversal filter.

These and other objects are achieved according to the invention by alternately transmitting the reference signal in inverted and non-inverted form and reinverting the received reference signal transmitted in inverted form prior to generating the error signal, thereby negating the effects of DC offsets acquired by the reference signal during transmission and reception.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
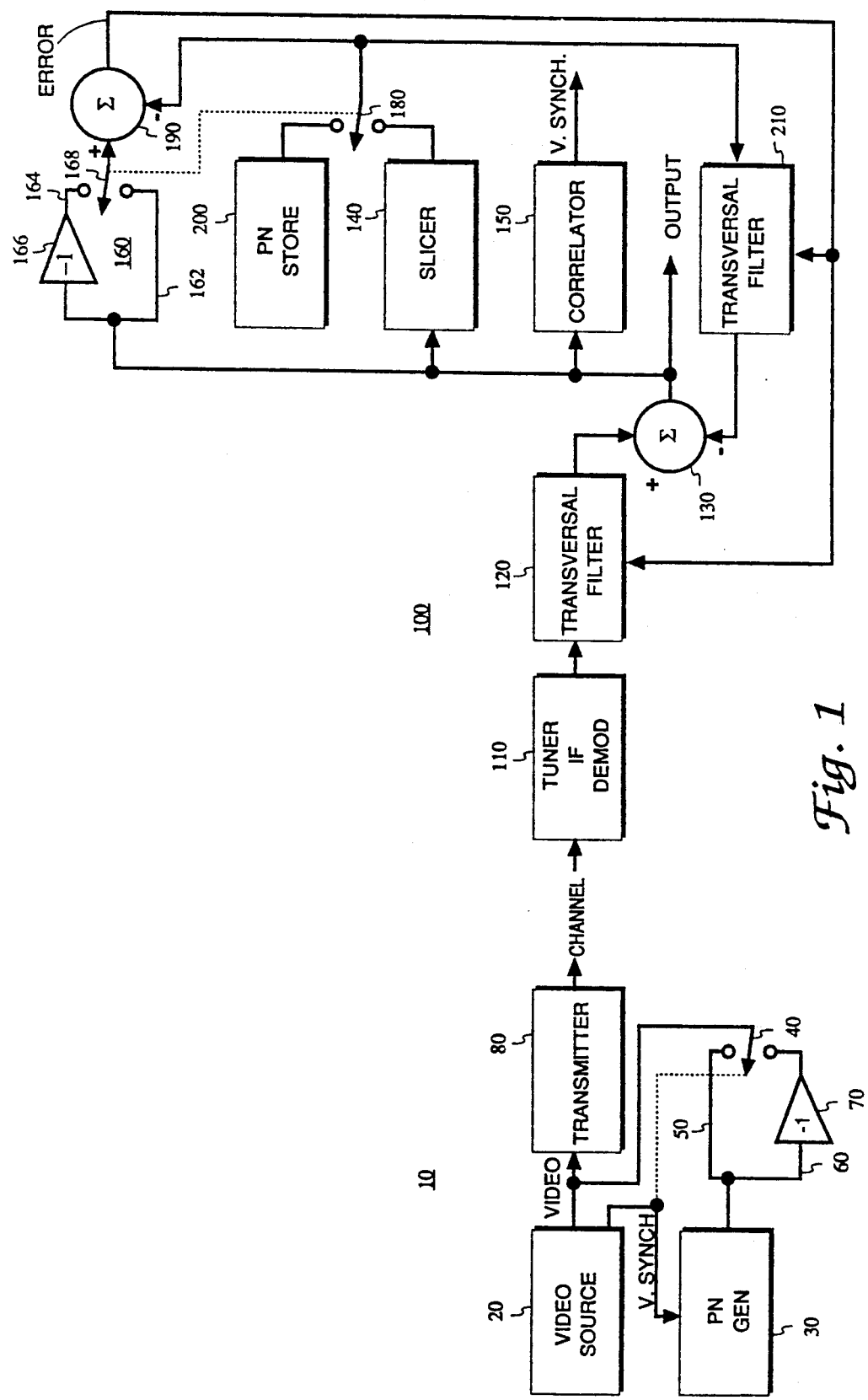
FIG. 1 is a block diagram of an adaptive equilization system constructed in accordance with the invention.

The system of the present invention is illustrated in the block diagram of FIG. 1. While this drawing illustrates the application of the invention to a television system, it will be understood that the principles of the invention are equally applicable to the transmission and reception of various other types of information bearing signals. Thus, referring to FIG. 1 while keeping the latter proviso in mind, a television signal transmitter, designated generally by reference numeral 10, broadcasts a video signal encoded in a given format over a selected 6MHz television channel for reception and reproduction by a corresponding receiver 100 tuned to the selected channel. The video signal may, for example, be encoded in an NTSC format, or alternatively, in a wideband HDTV format. In the latter case, the video signal may be derived by compressing a wideband video source signal to provide a plurality of 4-level digital samples forming 787.5 progressively scanned lines per frame, 720 of which represent active video. The video signal is preferably characterized by a vertical repetition rate equal to the NTSC field rate and a horizontal repetition rate equal to three times the NTSC horizontal scanning rate.

Figure 2:
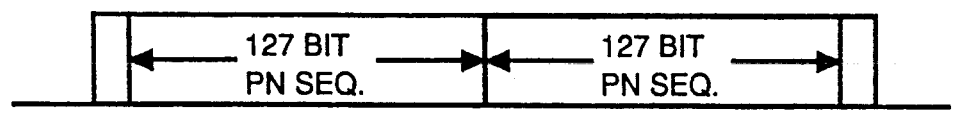
FIG. 2 illustrates a reference signal comprising two 127 bit PN sequences used in the system of FIG. 1.

The video signal is provided by a video source 20 which also couples a vertical synchronizing signal to a reference source which may, for example, comprise a pseudo noise (PN) generator 30. Generator 30 is responsive to the vertical synchronizing signal for generating a successive series of maximum length pseudo random sequences. In particular, in response to each vertical sync signal from video source 20, PN generator 30 outputs a reference signal comprising two 127 bit PN sequences as illustrated in FIG. 2. In accordance with the invention, the reference signal is applied to a switch 40 over a first non-inverting path 50 and a second inverting path 60 including an inverter 70. Switch 40 is controlled in response to the vertical synch signal from video source 20 for alternately inserting the reference signal in inverted and non-inverted form on a selected line of the video signal in successive fields or frames. As will be explained in further detail hereinafter, the reference signal, which, together with the video signal from source 20, is applied to a transmitter 80 for transmission over a 6MHz television channel, is used in receiver 100 for recovering a vertical synch signal and also for controlling a ghost cancellation process.

Figure 3:
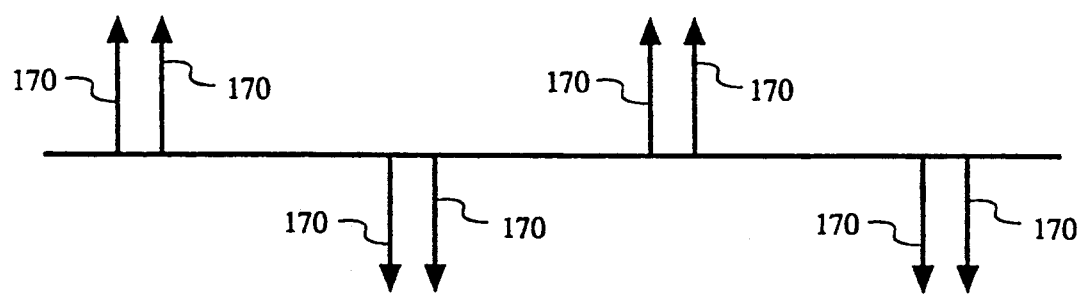
FIG. 3 is a waveform depicting the output of correlator 150 of FIG. 1.

Receiver 100 includes an input stage 110 comprising a tuner, IF amplifier and demodulator for receiving and demodulating the broadcast signal, including the digital video samples and the reference signal. The output of input stage 110 is applied to a first transversal filter 120, whose output is coupled to the positive input of a summer 130. The output of summer 130, which comprises the de-ghosted video signal, is coupled to the input of a data slicer 140, the input of a digital full correlator 150 and to the input of a switching circuit 160. Correlator 150 is configured in correspondence with the two 127-bit PN sequences comprising the transmitted reference signal such that each pair of received PN sequences results in a pair of output pulses 170 from the correlator as illustrated in FIG. 3. Pairs of pulses 170, which are produced at a frame rate, comprise a vertical synch signal and are alternately inverted because of the alternate inversion of the PN sequences in successive frames at the transmitter. As is well known in the art, pulses 170 are produced by correlator 150 with a gain of 127 to provide a high degree of noise immunity.

The vertical synch pulses 170 produced at the output of correlator 150 are used to control switching circuit 160 and a switch 180. More specifically, switching circuit 160 comprises a non-inverting path 162 and an inverting path 164, including an inverter 166, both coupled to an output switch 168. Switch 168 is operated in response to vertical synch pulses 170 such that non-inverting path 162 is coupled to the positive input of a summer 190 during the frames when the PN sequences are transmitted in non-inverted form and the inverting path 164 is coupled to summer 190 during the alternate frames when the sequences are transmitted in inverted form. The negative input of summer 190 is supplied with the two 127-bit PN sequences from a memory 200 such that the output of summer 190 comprises an error signal representing the difference between the output of switching circuit 160 and the stored PN sequences. The error signal produced at the output of summer 190 is fed back to control transversal filter 120 and a second transversal filter 210 which receives the video output from switch 180 and, in turn, applies a signal to the negative input of summer 130. As will be explained hereinafter, transversal filter 120 is operable for canceling pre-ghosts introduced into the received video signal and transversal filter 210 is operable for canceling post-ghosts.

According to conventional practice, each PN reference signal generated by PN generator 30 is transmitted in non-inverted form during successive frames of the video signal. Each received PN reference signal is then coupled from the output of summer 130 directly to the positive input of summer 190 which provides an error signal representing the difference between the received PN reference signal and the stored PN reference signal. Ideally, the error signal represents the pre or post ghost components of the transmitted PN reference signal. Transversal filters 120 and 210 are adapted in a recursive mode in response to the error signal to cancel the ghost components of the reference signal. That is to say, transversal filters 120 and 210 are adapted according to a least mean square (LMS) algorithm to minimize the error signal thereby canceling ghost components of the reference signal. Due to the recursive nature characterizing the operation of transversal filters 120 and 210, it may take a number of frames before the taps of the two filters are appropriately set for fully canceling the received ghost components. However, once properly set for canceling the reference signal ghost components, the filters will also be effective for canceling ghost components of the received video signal, since the video ghost components will have the same relationship to the received video signal as the reference signal ghost components have to the received reference signal.

The utility of the conventional system as described above is largely negated due to DC offsets acquired by the received PN reference signal. A DC offset may be introduced during transmission or during demodulation of the received signal in input stage 110. In any event, since the PN reference signal stored in memory 200 does not include a corresponding DC offset, the error signal produced at the output of summer 190 is characterized by a constant error component representing the DC offset. The constant error component is fed-back to and adapts transversal filters 120 and 210 incorrectly.

According to an important aspect of the present invention, the foregoing problem is obviated by providing the synchronously operating switching circuits in the transmitter and receiver as illustrated in FIG. 1. More particularly, during a first frame the PN reference signal is transmitted in a non-inverted form. The received reference signal plus the DC offset (PN+DC) are applied to summer 190 through the non-inverting path of switching circuit 160 for providing an error signal (PN+DC)−PN=+DC. During the next successive frame, switch 40 is connected to inverting path 60 so that the reference signal is transmitted in inverted form (i.e. −PN). The received reference signal and the DC offset is now equal to (−PN +DC). This signal is applied to summer 190 through inverting path 164 of switching circuit 160 for providing an error signal −(−PN+DC)−PN=−DC. Thus, during successive frames, the DC offset component of the error signal will alternate between (+DC) and (−DC). At the same time, the received and stored reference signals will cancel in both frames leaving only the contribution represented by ghost components of the received reference signal. Due to the recursive nature of transversal filters 120 and 210, the alternating DC offset components (+DC and −DC) of the error signal will effectively be ignored. Thus, the filter taps are set only in response to the component of the error signal reflecting the ghost components of the received reference signal as desired.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing descriptions and accompanying drawings is offered by way of illustration only and not as a limitation. The actual scope of the invention is intended to be defined in the following claims when viewed in their proper perspective based on the prior art.

I claim:

1. In a system of the type wherein a reference signal is transmitted and received during successive spaced time intervals of an information signal and a stored representation of the reference signal is subtracted from the received reference signal to derive a feedback signal for controlling an adaptive filter for equalizing the received information signal, the improvement comprising:

means for transmitting said reference signal in inverted and non-inverted form during alternate ones of said time intervals; and means for reinverting the received reference signals transmitted in inverted form prior to deriving said feedback signal such that DC offsets acquired by the transmitted reference signal are produced as opposite polarity components of said feedback signal during alternate ones of said time intervals.

2. The improvement of claim 1 wherein said reference signal comprises a predetermined pseudo noise sequence.

3. The improvement of claim 1 wherein said information signal comprises a television signal and wherein said reference signal is transmitted during successive periodically spaced intervals of said television signal.

4. The improvement of claim 1 wherein said means for transmitting comprises means for applying said reference signal to a non-inverted path and to an inverting path and means for alternately combining the outputs of said paths with said information signal.

5. The improvement of claim 1 including means for applying the received reference signal to a non-inverting path and to an inverting path and means for alternately switching between said paths for reinverting the received reference signal transmitted in inverted form.

6. In a system of the type wherein a reference signal is transmitted and received during successive spaced time intervals of a television signal and a stored representation of the reference signal is combined with the received reference signal to derive a feedback signal for controlling an adaptive filter for canceling ghost components of the received television signal, the improvement comprising means for synchronously inverting and reinverting the transmitted and received reference signals respectively during alternate ones of said time intervals such that DC offsets acquired by the transmitted reference signal are produced as opposite polarity components of said feedback signal during alternate ones of said time intervals.

7. The improvement of claim 6 wherein said reference signal comprises a predetermined pseudo noise sequence.

8. The improvement of claim 6 including means for synchronously operating respective switching circuits for inverting and reinverting said transmitted and received reference signals respectively during alternate ones of said time intervals.

9. A method of equalizing a transmitted information signal comprising:
   inserting reference signals $(+R)$ and $(-R)$ in said transmitted information signal during alternate ones of a plurality of successive spaced time intervals;
   receiving the transmitted information signal and recovering the reference signals therefrom in the form $(+R +DC)$ and $(-R +DC)$ during alternate ones of said time intervals, where the term $(+DC)$ represents a DC offset acquired by the received reference signals.
   inverting the reference signal recovered in the form $(-R +DC)$ such that it assumes the form $(+R-DC)$; and
   combining said received reference signal $(+R+DC)$ and said inverted reference signal $(+R-DC)$ with a stored representation of the reference signal $(+R)$ to derive an error signal controlling an adaptive filter for equalizing the received information signal, the error signal being characterized by opposite polarity components $(+DC)$ and $(-DC)$ during alternate ones of said time intervals.

10. The method of claim 9 wherein said reference signal comprises a predetermined pseudo noise sequence.

* * * * *